United States Patent [19]
Butterworth

[11] Patent Number: 5,207,879
[45] Date of Patent: May 4, 1993

[54] BIPOLAR MEMBRANE STACK AND METHOD FOR PRODUCTION OF LOW CHLORIDE SODIUM HYDROXIDE

[75] Inventor: Donald J. Butterworth, Stirling, N.J.

[73] Assignee: The Graver Company, Union, N.J.

[21] Appl. No.: 667,542

[22] Filed: Mar. 11, 1991

[51] Int. Cl.$^5$ .............................................. B01D 61/00
[52] U.S. Cl. ................................... 204/182.4; 204/98; 204/103; 204/182.5; 204/301
[58] Field of Search ...................... 204/182.4, 301, 98, 204/103, 182.5

[56] References Cited

U.S. PATENT DOCUMENTS

| | | | |
|---|---|---|---|
| 4,024,043 | 5/1977 | Dege et al. | 204/296 |
| 4,536,269 | 8/1985 | Chlanda et al. | 204/182.4 |
| 4,880,513 | 11/1989 | Davis et al. | 204/182.4 |

Primary Examiner—John Niebling
Assistant Examiner—Arun S. Phasge
Attorney, Agent, or Firm—Dressler, Goldsmith, Shore, Sutker & Milnamow, Ltd.

[57] ABSTRACT

A method and bipolar membrane stack for the generation of acid and base solutions from a salt by electrodialysis. The unit cells of the stack comprise a novel arrangement of membranes which provide four liquid flow channels. One of the channels has circulating therein a multivalent acid solution which acts as a buffer and presents leakage of the salt anion through the bipolar membrane, thereby producing base solution of substantially reduced salt-anion contamination. The method can be operated on a continuous basis.

11 Claims, 2 Drawing Sheets

BIPOLAR MEMBRANE STACK AND METHOD FOR PRODUCTION OF LOW CHLORIDE SODIUM HYDROXIDE

BACKGROUND OF THE INVENTION

This invention relates generally to electrodialysis of a salt solution for generating acid and base solutions and, more particularly, to an improved method and four channel bipolar membrane stack for producing low chloride sodium hydroxide.

It is well known in the art that acid and base solutions may be generated from a salt solution by the electrodialysis water splitting process. In general, the electrodialysis process consists of a stack containing a plurality of cation-selective membranes, bipolar membranes, and anion-selective membranes positioned between a pair of electrodes. The stack itself comprises an assembly of a plurality of unit cells, each unit cell comprising the said membranes arranged to provide a plurality of parallel flow paths or channels therebetween. When a direct electrical current is applied to the bipolar membrane, water is split into hydroxyl ions and hydrogen ions which migrate or travel to the anode and cathode respectively. At the same time, the cation-selective membrane passes cations traveling toward the cathode while blocking anions, and the anion-selective membrane passes anions traveling toward the anion while blocking cations. If a salt solution such as sodium chloride is directed through the channel between the cation and anion-selective membranes, the concentration of that solution is depleted as hydrochloric acid and sodium hydroxide are formed in adjacent acid and base containing channels. With suitable controls, pumps and associated collecting vessels, the acid and base may be withdrawn for subsequent use and the concentration of the salt solution replenished as required.

An electrodialysis process of the type indicated is fully described in the commonly assigned U.S. Pat. No. 4,880,513, and the teachings of that patent are incorporated herein by reference. The method disclosed in said patent is a fill and draw or batch method wherein various controls, such as pH and liquid level switches are utilized to periodically withdraw the desired acid and base and replenish the raw material salt solution. That process also utilizes a common bipolar membrane stack consisting of three-channel unit cells comprising a bipolar membrane having an anion-selective membrane on one side thereof and a cation-selective membrane on the opposite side thereof.

It has been found that the production of sodium hydroxide from a plentiful salt like sodium chloride in a bipolar membrane stack produces sodium hydroxide that may be contaminated with small amounts of chloride ions, apparently resulting from leakage of chloride ions through the bipolar membrane. For certain applications, such as regenerating anion-exchange resins for use in nuclear power stations, low chloride or substantially pure sodium hydroxide is required. The chloride level in sodium hydroxide produced by a bipolar membrane stack can be reduced by improvements in the anion side of the bipolar membrane, but usually only at the expense of higher membrane resistance which requires more power and cooling water to operate the stack.

The chloride level in sodium hydroxide produced by a bipolar membrane stack can also be lowered by operation in a fill and draw batch method of the type described. That method utilizes the fact that the amount of chloride contamination increases as the concentration of the sodium hydroxide is increased. However, that process must be operated as a batch process and there are upper limits to the sodium hydroxide concentration for a given chloride contamination.

There thus exists a need for a low-cost method and apparatus for producing sodium hydroxide with reduced chloride contamination by electrodialysis of a salt in a bipolar membrane stack.

SUMMARY OF THE INVENTION

The present invention provides an improved method and a novel bipolar membrane stack for production of low chloride sodium hydroxide from a salt by electrodialysis. The method is cost-efficient and is operable on a continuous basis.

More specifically, the invention comprises an electrodialytic unit cell having four flow paths or channels and a bipolar membrane stack comprising a multiplicity of such unit cells. Each unit cell comprises a first cation-selective membrane spaced from the anion-selective face of the bipolar membrane, a second cation-selective membrane spaced from the cation-selective face of the bipolar membrane, an anion-selective membrane spaced from the second cation-selective membrane, and a third cation-selective membrane spaced from the anion-selective membrane.

In accordance with a preferred form of the invention, the raw salt material, preferably sodium chloride, is directed through the channel formed between the anion-selective membrane and the third cation-selective membrane. Hydrochloric acid is generated and flows in the channel formed between the anion-selective membrane and the second cation-selective membrane, and sodium hydroxide is generated and flows in the channel formed between the bipolar membrane and the first cation-selective membrane. The fourth channel, that formed by the bipolar membrane and the second cation-selective membrane, has flowing through it an acid with a multivalent anion such as sulfuric or phosphoric. It has been discovered that the presence of the multivalent acid in the fourth channel serves as a buffer and substantially prevents leakage of chloride ions through the bipolar membrane which results in the production of less contaminated sodium hydroxide. It has also been found that the quantity of the multivalent acid after initial charging and flow remains substantially constant so that the method is highly economical.

Other features and advantages of the invention will be apparent from the following description of a preferred embodiment thereof and the claims.

DESCRIPTION OF A PREFERRED EMBODIMENT

Figure 1:
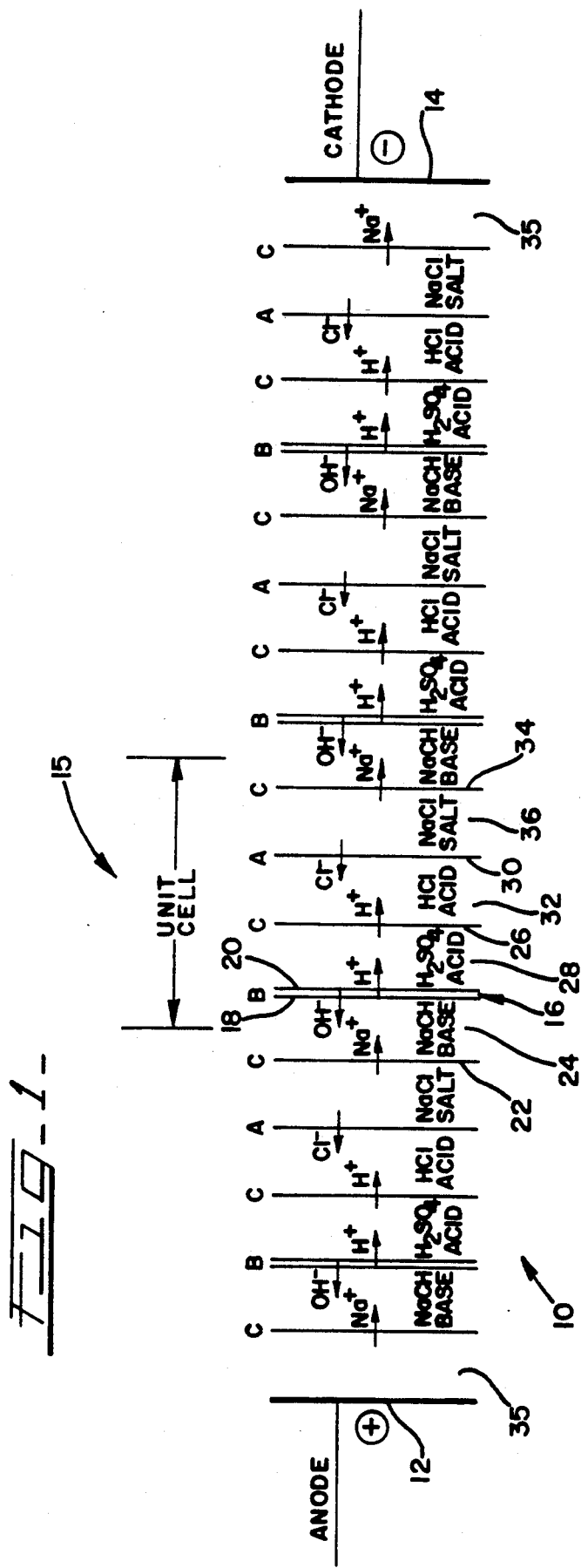
FIG. 1 is a schematic representation of an electrodialytic bipolar membrane stack embodying the principles of the invention.

Referring in detail the FIG. 1, a schematic representation of an electrodialytic bipolar membrane stack 10 embodying the principles of the invention is shown. The stack 10 comprises a multiplicity of unit cells 15 and the ends of the stack are in electrical contact with a direct current anode electrode 12 and cathode electrode 14.

Each unit cell 15 comprises a bipolar membrane 16 having an anion-selective face 18 directed toward the anode 12 and a cation-selective face 20 directed toward the cathode 14. A first cation-selective membrane 22 is spaced from the anion-selective face 18 and forms therebetween a first flow channel 24. A second cation-selective membrane 26 is spaced from the cation-selective face 20 and forms therebetween a second flow channel 28. An anion-selective membrane 30 is spaced from the second membrane 26 and forms therebetween a third flow channel 32. A third cation-selective membrane 34, which also comprises the first cation-selective membrane of the next adjacent unit cell, is spaced from the anion-selective membrane 30 and forms therebetween a fourth flow channel 36. Electrode rinse channels 35 are provided between the electrodes 12 and 14 and their associated outermost ion-exchange membranes.

Operation of the method of the invention is continuous and all of the liquids are continuously recirculating. Second channel 28 is initially charged with a multivalent acid, preferably sulfuric. A raw material salt solution, preferably sodium chloride, is circulated through the fourth channel 36. Water, initially, is circulated through the first and third channels 24 and 32. Application of DC current to the stack 10 causes sodium hydroxide (base) to form in the first channel 24 and hydrochloric acid to form in the third channel 32, thereby depleting the raw material salt solution.

During continuous operation and recirculation of the various liquids, saturated sodium chloride salt solution is constantly being added to channel 36 to maintain the raw material liquid at the desired concentration. As acid and base are withdrawn from the channels 24 and 32 respectively, water is added to those channels to maintain the desired concentrations. Importantly, the quantity of the sulfuric acid buffer remains essentially constant because substantially equal numbers of hydrogen ions enter and leave the second channel 28. Water is added to channel 28 to replace the water split by the bipolar membrane into hydrogen and hydroxide ions and to maintain the desired concentration of sulfuric acid. Over extended periods of operation of the stack, there may be some loss of acid so that the occasional addition of nominal amounts of sulfuric acid may be required to maintain the optimum concentration for performing its chloride ion blocking function.

Figure 2:
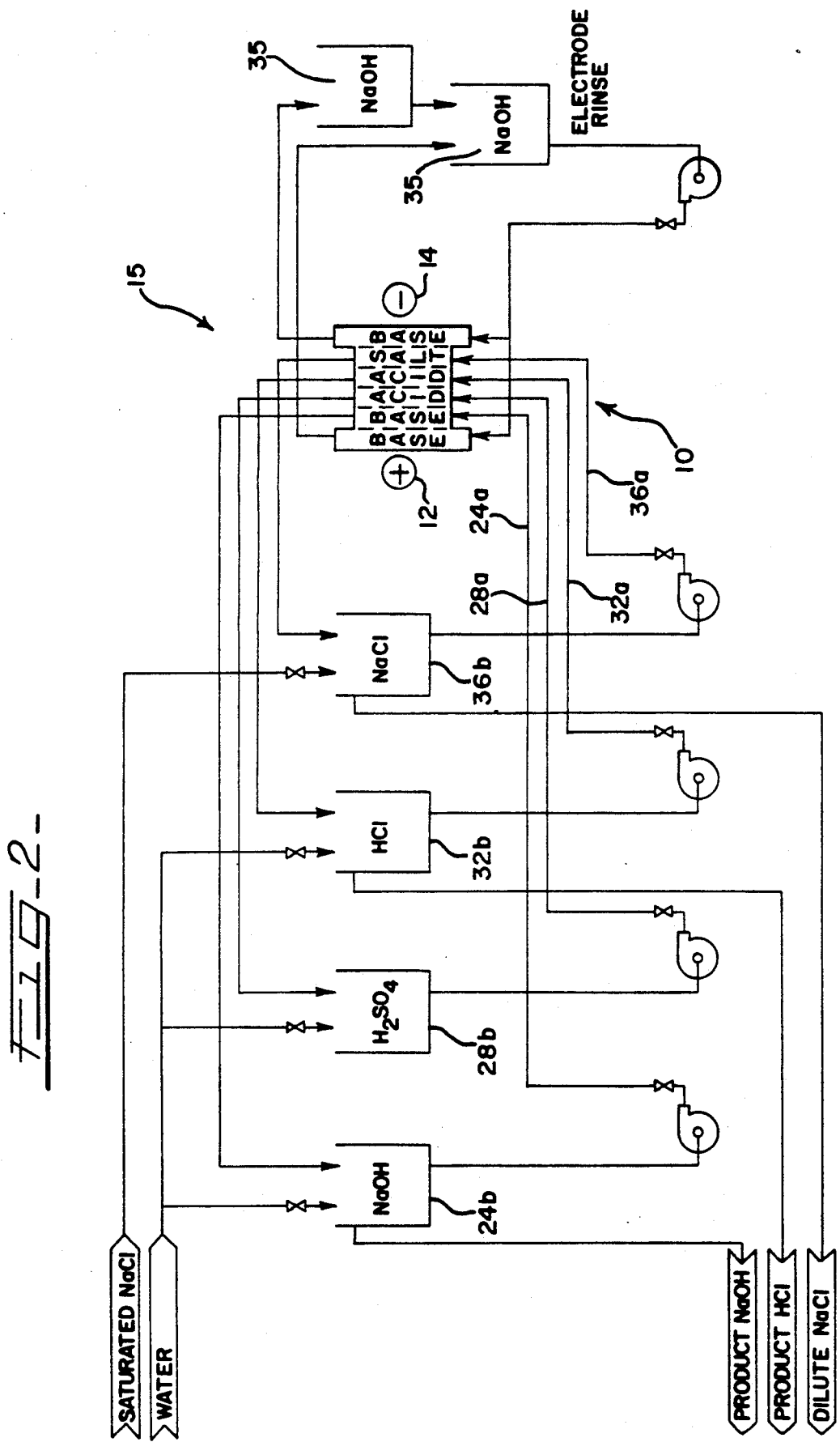
FIG. 2 is a flow diagram illustrating the method of operation according to the invention.

Referring now to FIG. 2, the flow diagram illustrates the method embodying the principles of the invention. A stack 10, only partially shown, is comprised of a number of unit cells 15. Each unit cell comprises four channels 24, 28, 32 and 36 as previously described. Suitable pumps and valves are associated with the flow channels as indicated, with lines 24a, 28a, 32a and 36a carrying solutions to their respective channels. Solution tanks 24b, 28b, 32b and 36b are associated with the flow channels and form operational flow loops with their respective channels. It will be noted that water is continuously added into channels 24, 28 and 32, while a substantially saturated solution of sodium chloride is continuously added into the channel 36. Alternatively, the water and saturated sodium chloride solution may be added to their respective tanks 24b, 28b, 32b and 36b. The product sodium hydroxide is removed continuously as overflow from tank 24b and the product hydrochloric acid is removed continuously as overflow from the tank 32b. The overflow from tank 36b comprises the diluted salt which is recycled through a source of sodium chloride (not shown) to continuously reintroduce substantially saturated salt solution into the channel 36. The rate of flow of the water and salt solution into the respective channels is substantially greater than the rate of overflow removal of products and dilute salt. Preferably, the ratio of input flow rate to output or product flow rate is on the order of 10 to 1.

Practice of the invention and comparision thereof with the known three-channel unit cell comprising an anion-selective membrane and cation-selective membrane on opposite sides of a bipolar membrane is further illustrated in the following:

EXAMPLE

A three-channel unit cell stack and a four-channel unit cell stack in accordance with the invention were operated concurrently under the following operating conditions:

| Stream | Concentration (N) | Flow Rate cc/min | Product Overflow and Makeup-cc/min |
|---|---|---|---|
| HCl | 1.0 (target) | 1510 | 30 |
| NaOH | 1.0 (target) | 1510 | 30 |
| NaCl | 1.07 (set) | 1510 | 7.1 |
| Electrode Rinse | 3.8 (NaOH) | 7570 | 0 |
| $H_2SO_4$ (4-channel) | 1.0 | 1510 | 0 |

Concurrent operation of the two stacks produced the following results:

| Time (Hrs) | 3-Channel | | | 4-Channel | | | |
|---|---|---|---|---|---|---|---|
| | Conc. | ppmNa | ppmCl | Conc. | ppmNa | ppmCl | ppmSO4 |
| HCl | | | | | | | |
| 0 | 1.00 | <1 | | 1.00 | <1 | | |
| 1 | 0.99 | 300 | | 0.99 | 175 | | |
| 2 | 1.02 | 375 | | 1.04 | 325 | | |
| 3 | 1.04 | 450 | | 0.98 | 425 | | |
| 4 | 1.05 | 425 | | 1.05 | 500 | | |
| 5 | 1.05 | 450 | | 1.06 | 550 | | |
| 6 | 1.02 | 475 | | 1.08 | 575 | | |
| 7 | 1.08 | 450 | | 1.04 | 600 | | |
| NaOH | | | | | | | |
| 0 | 1.00 | | <2 | 1.00 | | <2 | <1 |
| 1 | 0.88 | | 1100 | 0.95 | | 71 | 315 |
| 2 | 0.96 | | 1424 | 0.99 | | 56 | 275 |
| 3 | 1.01 | | 1650 | 1.04 | | 71 | 375 |
| 4 | 0.99 | | 1678 | 1.03 | | 71 | 312 |
| 5 | 0.97 | | 1692 | 1.02 | | 71 | 245 |

-continued

| Time | 3-Channel | | | 4-Channel | | | |
|---|---|---|---|---|---|---|---|
| (Hrs) | Conc. | ppmNa | ppmCl | Conc. | ppmNa | ppmCl | ppmSO$_4$ |
| 6 | 1.01 | | 1804 | 1.01 | | 56 | 390 |
| 7 | 0.96 | | 1750 | 1.03 | | 71 | 285 |

While the preferred buffer acid has been described as comprising sulfuric, other multivalent acids may be employed, provided that the acids are sufficiently ionized in solution to function as an electrolyte. Such acids might include, for example, phosphoric, acetic, citric and oxalic.

The various membranes employed in the invention are available as standard articles of manufacture. For example, suitable anion, cation and bipolar membranes are known to be manufactured by Asahi Glass AAV, Allied Corporation, Tokuyama Soda, and WSI Technologies.

From the foregoing description, it should be apparent that the invention provides a novel method and bipolar membrane stack for the electrodialytic generation of acid and base solutions which produces base solutions substantially free of contamination by the anion of the salt. While the invention has been described with reference to the generation of hydrochloric acid and sodium hydroxide from sodium chloride, it will be understood that the principles of the invention are applicable to other salts and acid and base products. The invention may be efficiently operated in continuous mode and is particularly useful in systems where base product of high purity is required. Moreover, the language employed herein is for purposes of description rather than limitation, and various changes can be made without departing from the spirit or scope of the invention which is defined in the appended claims.

I claim:

1. An electrodialysis cell for the generation of acid and base solutions from a salt solution comprising:
    a bipolar membrane having an anion-selective face and a cation-selective face;
    a plurality of ion-selective membranes, positioned with respect to said bipolar membrane to provide at least four liquid flow channels;
    a first flow channel being formed by a first cation-selective membrane spaced from the anion-selective face of the bipolar membrane;
    a second flow channel being formed by a second cation-selective membrane spaced from the cation-selective face of the bipolar membrane;
    a third flow channel being formed by an anion-selective membrane spaced from said second cation-selective membrane; and
    a fourth flow channel being formed by a third cation-selective membrane spaced from said anion-selective membrane.

2. An electrodialysis stack for the generation of acid and base solutions from a salt solution including a plurality of unit cells assembled for operational positioning between anode and cathode electrodes, each unit cell comprising:
    a bipolar membrane having an anion-selective face facing toward said anode and a cation-selective face facing toward said cathode;
    an anion-selective membrane and at least two cation-selective membranes arranged about said bipolar membrane and forming at least four liquid flow channels;
    a first cation-selective membrane being spaced from the anion-selective face of said bipolar membrane and a second cation-selective membrane being spaced from the cation-selective face of said bipolar membrane, thereby respectively forming first and second liquid flow channels;
    the anion-selective membrane being spaced from said second cation-selective membrane and forming therewith a third liquid flow channel; and
    the first cation-selective membrane of the next adjacent unit cell being spaced from said anion-selective membrane and forming therewith the fourth liquid flow channel.

3. A method of generating a product acid solution and a product base solution by electrodialysis of a salt solution which comprises:
    using an electrodialysis cell comprising an anode and a cathode and a unit cell defining a plurality of flow channels disposed between the anode and cathode;
    circulating a base solution through a first channel formed by a first cation-selective membrane and the anion-selective face of a bipolar membrane;
    circulating a a second solution through a second channel formed by a second cation-selective membrane and the anion-selective face of the bipolar membrane;
    circulating an acid solution through a third channel formed by a anion-selective membrane and the second cation-selective membrane;
    circulating a salt solution through a fourth channel formed by a third cation-selective membrane and the anion-selective membrane; and
    applying a direct current across the anode and cathode.

4. A method according to claim 3 wherein there are a plurality of unit cells and the third cation-selective membrane of each unit cell comprises the first cation-selective membrane of the next adjacent unit cell.

5. A method according to claim 3 wherein the salt is sodium chloride and the base is sodium hydroxide.

6. A method according to claim 5 wherein the second acid solution is an ionizable acid containing multivalent anions, said multivalent acid substantially preventing contamination of the sodium hydroxide by chloride ions from the salt.

7. A method according to claim 6 wherein said acid containing multivalent anions is sulfuric acid.

8. A method for generating a product acid solution and a product base solution by electrodialysis of a salt solution in a bipolar membrane stack having a plurality of at least four-channel unit cells comprising in order a base channel, a buffer channel, an acid channel and a salt channel, said method comprising:
    continuously circulating each of the acid, base and salt solutions respectively through the acid, base and salt channel in each of the unit cells, one of said channels comprising an anion-selective membrane; and
    continuously circulating a second acid solution through the buffer channel in each of said unit cells, said second acid reducing leakage of the salt anion through the bipolar membrane, so that the base solution formed is substantially free of the anion of the salt.

9. A method according to claim 8 wherein each unit cell comprises a bipolar membrane having an anion-selective face and a cation-selective face;

the base flow channel being formed by a first cation-selective membrane spaced from the anion-selective face of the bipolar membrane;

the buffer flow channel being formed by a second cation-selective membrane spaced from the cation-selective face of the bipolar membrane;

the acid flow channel being formed by an anion-selective membrane spaced from the second cation-selective membrane; and the salt solution flow channel being formed by a first cation-selective membrane of the next adjacent unit cell spaced from the anion-selective membrane.

10. A method according to claim 9 wherein said salt comprises sodium chloride and said second acid comprises an acid solution containing multivalent anions.

11. A method according to claim 10 wherein said second acid comprises sulfuric.

* * * * *